US005274194A

United States Patent [19]

Belcher

[11] Patent Number: 5,274,194

[45] Date of Patent: Dec. 28, 1993

[54] ANTI-STAT CARRIER TUBE FOR ELECTRONIC CONNECTORS

[75] Inventor: Garry B. Belcher, Wilmington, Del.

[73] Assignee: Acro-Pack Corp., Wilmington, Del.

[21] Appl. No.: 834,367

[22] Filed: Feb. 12, 1992

[51] Int. Cl.[5] .......................... H05K 5/00; H02G 3/04

[52] U.S. Cl. .......................................... 174/50; 174/97

[58] Field of Search ................... 174/50, 95, 97, 99 R, 174/101; 272/91; 439/467, 596

[56] References Cited

U.S. PATENT DOCUMENTS 3,786,171 1/1974 Shira .................................... 174/97

FOREIGN PATENT DOCUMENTS 141284 3/1961 U.S.S.R. ............................... 174/97

*Primary Examiner*—Harold Broome

*Attorney, Agent, or Firm*—Connolly & Hutz

[57] ABSTRACT

A carrier tube for electronic connectors and the like comprises an elongated hollow body consisting of a base member and a top member extruded from a plastic material having an anti-stat coating. The base member is of generally u-shaped profile with a pair of end walls extending perpendicularly from an intermediate flat bight wall. The top member is a leg of generally L-profile with an elongated cover wall and a depending offset wall. The top member is hinged to one of the end walls by an integral live hinge. The offset of the cover wall has locking elements which engage complementary locking elements on the other of the end walls so that electronic connectors or the like can be inserted into the hollow body after the cover member is pressed closed with the connectors being inserted into the open end of the closed tubular body.

12 Claims, 1 Drawing Sheet

14
24
10
22
26
16
12
20
18

5
5
80
78
26
22
14
24

22
52
24
54
48
58
50
62
42
46
60
44
56
38
32
40
30
36
34
28
18

26
74
74
74
22
10
78
80
82
16
76
76
72
64
66
68
70
20
18

22
24
38
18
20

ANTI-STAT CARRIER TUBE FOR ELECTRONIC CONNECTORS

BACKGROUND OF INVENTION

The present invention relates to an anti-static carrier tube for electronic connectors and the like. Electronic connectors are prevalent in the computer industry. It is necessary for proper operation that such connectors be shielded in an anti-stat carrier tube. Various techniques have been attempted to provide a suitable manner of accomplishing this. For example, extruded carrier tubes have been provided with separators or partitions disposed within the hollow tubes for proper placement of the electronic connectors. One of the difficulties, however, that has been encountered with conventional techniques is to be able to form the connectors inside the tube and to conveniently insert the connectors in the tubes and yet provide a virtually full proof type carrier tube for effectively housing the electronic connectors.

SUMMARY OF INVENTION

An object of this invention is to provide an anti-stat carrier tube for electronic connectors.

A further object of this invention is to provide such a carrier tube whereby the electronic connectors or the like may be readily inserted without impairing the anti-stat protective nature of the tube.

In accordance with this invention, the carrier tube is extruded from a plastic material in the form of an elongated hollow body consisting of a base member and a top member with an anti-stat coating. The base member is of generally U-shaped profile with a pair of end walls extending generally perpendicularly from an intermediate flat bight wall. The top member is in the form of a leg having a generally L-profile consisting of a elongated cover wall and an offset wall perpendicular to the cover wall. One end of the cover wall is integrally connected to one of the end walls by a live hinge. The other end wall includes locking members which engage complementary locking members on the offset wall so as to permit the tube to be extruded in slightly open condition. The tube is then closed and the electronic components inserted into the carrier tube and then securely protected by being housed in the closed tube.

In a preferred practice of this invention, the cover member is biased to an open position at an acute angle which is sufficient to permit the separators or partitions to be formed inside. Preferably, the locking members are provided on the inner and outer surfaces of the base member and top member so as to provide a double snap lock when the members are pressed toward each other.

THE DRAWINGS

DETAILED DESCRIPTION

Figures 1, 2, 3, 4, 5:
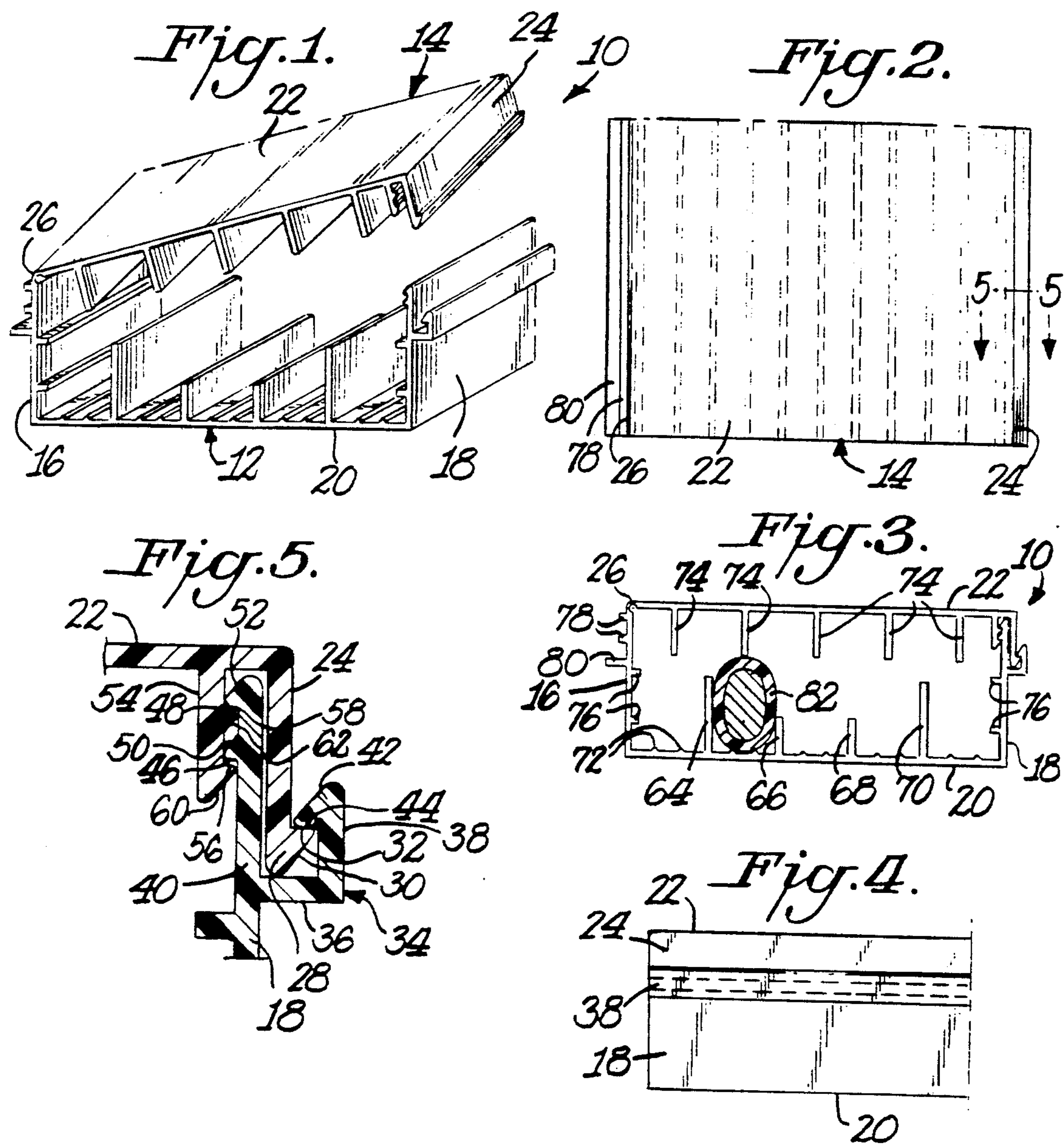
FIG. 1 is a perspective view showing an extruded plastic carrier tube in accordance with this invention.
FIG. 2 is a top plan view of the carrier tube shown in FIG. 1 when in its closed position.
FIG. 3 is an end elevational view of the carrier tube shown in FIG. 2.
FIG. 4 is a side elevational view of the carrier tube shown in FIGS. 2-3.
FIG. 5 is a cross-sectional view taken through FIG. 2 along the line 5—5.

FIGS. 1-5 illustrate an anti-stat carrier tube 10 in accordance with this invention. As shown therein housing 10 is in the form of an elongated hollow body which is extruded from a suitable plastic material such as clear rigid polyvinylchloride (pvc) having a suitable anti-stat coating. Although rigid pvc is used such material has limited resiliency to permit some deflection of its free ends and then have the free ends return toward their original condition. The body consists of a base member 12 and a top member 14. Base member 12 is of generally U-shaped profile with a pair of end walls 16,18 which extend generally perpendicularly from an intermediate flat bight wall 20. End wall 16 may be considered a hinge wall and end wall 18 may be considered a lock wall as later described.

Top member 14 is in the form of a leg of generally L-profile with an elongated cover wall 22 and an offset wall 24 perpendicular to cover wall 22 at one edge thereof. The edge of cover wall 22 remote from offset wall 24 is integrally connected to hinge wall 16 by a live hinge 26. Live hinge 26 is formed by an arcuate relief at the junction of cover wall 22 and hinge wall 16.

Because of the nature of the material and the extrusion process, the leg or cover wall 16 is normally biased outwardly at an acute angle which is preferably no greater than 10° with respect to the horizontal or flat bight wall 20. Accordingly, the hollow body has a sufficient opening to permit the later described separators and partitions to be formed on the inside surface. After extrusion and before the tube 10 is cut, the tube is closed. The electronic connectors are later inserted through the open end of the tube.

An advantageous feature of this invention is the incorporation of complementary locking members at the open portion of housing 10. FIG. 5 illustrates in greater detail the locking members. As shown therein and described hereinafter, one set of locking members is provided on the outer surface of top wall 14 and on the outer surface of lock wall 18 while additional locking members are provided on the inner surface of top wall 22 and of lock wall 18 to advantageously provide a double snap lock when the tube 10 is pressed into its closed condition.

As shown in FIG. 5, offset wall 24 terminates in a lip 28 having an outwardly and upwardly inclined cam surface 30 with a horizontal shoulder 32 joined to the cam surface 30. Lock wall 18 is provided with a spring extension 34 formed by a horizontal flange 36 and a vertical wall 38 parallel to and spaced from a linear extension 40 of lock wall 18 so as to create a channel for receiving the lip 28 of offset wall 24. Because of the springy nature of the material, the cam surface 30 of lip 28 and the cam surface 42 of extension 34 ride against each other to urge extension wall 38 outwardly and permit lip 28 to pass under flat shoulder 44 until the flat shoulders 32 and 44 contact each other thereby firmly locking lip 28 in place by being trapped between shoulder 44 and flange 36.

The inner surface locking arrangement is also illustrated in FIG. 5. As shown therein, a pair of shoulders 46,48 extend perpendicularly from linear extension 40 of lock wall 18. Each shoulder merges into an inclined camming surface 50,52. A locking extension 54 is formed perpendicularly downwardly from cover wall 22 spaced from and parallel to offset wall 24. Locking extension 54 includes a pair of horizontal perpendicular shoulders 56,58 and inclined surfaces 60,62. During the closing action of top wall 22 the locking extension 54 is laterally deflected a sufficient amount when its camming surfaces 60,62 ride over camming surfaces 50,52 of linear extension 40 to permit the shoulders 56,58 to pass under linear extension shoulders 46,48 whereupon locking extension 54 snaps back into place and an unlocking action is prevented because of the abutting contact that would result from the corresponding shoulders of linear extension 40 and locking extension 54. It is noted that for manufacturing tolerance reasons a slight gap is provided between the corresponding shoulders on the inner locks whereas shoulders 32 and 44 are in actual contact.

Carrier tube 10 as illustrated herein includes various known partitions or separators to adapt device 10 to be particularly suited for housing electronic connectors. For example, as best shown in FIGS. 1 and 3 a series of vertical partitions 64, 66, 68, 70 extend upwardly from and perpendicularly to flat bight 20. Additionally, a series of longitudinal nubs 72 are provided on the inner floor of bight 20. Separators 64 and 70 are made of larger size than inner separators 66, 68. As also shown, a series of partitions 74 extend downwardly from cover wall 22. Partitions 74 are parallel to each other but staggered with respect to the partitions on the floor of bight member 20. Horizontal extensions 76 are also provided on the inner surface of end walls 16,18 and horizontal extensions 78,78 and 80 are provided on the outer surface of hinge wall 16. These various extensions or partitions are known in the art in connection with the housing of connectors 82, one of which is illustrated in FIG. 3 for exemplary purposes. The partitions or extensions serve to properly locate each electronic connector by acting as stop and abutments to prevent the connectors from sliding thereby assuring proper positioning of the connectors for their intended functions.

For manufacturing reasons, such partitions and other internal structures can not be formed on the inner surface of a closed extruded tube. It is thus necessary to extrude the tube at least partially open. The invention permits such extrusion and assures a reliably closed tube for housing the electronic connectors.

Carrier tube 10 may be formed of any suitable dimensions in accordance with the intended end use. For example, in one practice of the invention, the overall dimensions of housing 10 may be 2.56 inches as measured by the width of bight member 20 and 1.022 inches high as measured by the height of hinge wall 16. The thickness of each wall may be 0.04 inches thick. If desired, housing 10 could be made of a transparent material and could be extruded to any suitable length, such as 24.4 inches.

In use carrier tube 10 would be extruded with top member 14 in its open position as shown in FIG. 1. Pressure would then be applied to carrier tube 10 at the open space between offset 24 and linear extension 40 by squeezing against the top member 22 and bight wall 20 to snap the locking members together. The resultant lock renders the housing virtually unopenable to thereby assure that the later inserted electronic connectors or the like are firmly secured in place in an anti-stat environment. The transparency of the clear pvc material permits visual inspection of the electronic connectors within carrier tube 10 without requiring carrier tube 10 to be re-opened.

What is claimed is:

1. An extruded plastic carrier tube for electronic connectors and the like comprising an elongated hollow body extruded from a plastic material, said body consisting of a base member and a top member, said base member being of generally U-shaped profile with a pair of end walls extending generally perpendicularly from an intermediate flat bight wall, said top member being a leg of generally L-profile with an elongated cover wall and an offset wall perpendicular thereto at an edge thereof, said end walls comprising a hinge wall and a lock wall, said cover wall of said top member being integrally hingedly connected to the edge of said hinge wall remote from said bight wall by an integral live hinge, said offset wall and said lock wall including complementary locking members for locking said offset wall to said lock wall to form a closed unit whereby electronic connectors or the like may be inserted into said carrier tube and the electronic connectors or the like may be maintained shielded in said carrier tube, said top member being biased to an open position at an acute angle when said carrier tube is in said open condition, and said locking members are provided in sets located on the outer surfaces of said lock wall and said top member and on the inner surfaces of said lock wall and said top member.

2. The carrier tube of claim 1 wherein said plastic material is transparent and has an anti-stat coating.

3. The carrier tube of claim 2 wherein said offset wall terminates in a lip having an outwardly inclined surface and a locking shoulder, said lock wall having a springy extension including a flange parallel to and spaced from said lock wall to create a channel into which said offset wall may enter, said flange terminating in an inwardly directed lip having an inclined wall and lock shoulder for contacting said lock shoulder of said offset wall whereby said offset wall is trapped in said channel to comprise said set of locking elements on said outer surfaces.

4. The carrier tube of claim 3 wherein said lock wall terminates in a linear extension having an inwardly directed lock shoulder and an inclined surface, a locking extension extending perpendicularly from said cover wall toward said bight wall, said locking extension being spaced from and parallel to said offset wall to create a channel into which said linear extension may enter and outwardly directed inclined surface and lock shoulder on said locking extension whereby closing movement of said cover wall causes said locking extension to deflect to dispose said lock shoulders of said linear extension and said locking extension into the path of movement of each other to comprise said locking members on said inner surfaces.

5. The carrier tube of claim 4 including a second set of said locking elements on said inner surfaces.

6. The carrier tube of claim 4 wherein said live hinge comprises a relief extending along the said integral junction of said cover wall to said hinge wall.

7. The carrier tube of claim 6 including a plurality of spaced partitions extending perpendicularly from said cover wall toward said bight wall, a plurality of spaced partitions extending perpendicularly from said bight wall toward said cover wall and said partitions of said cover wall being staggered with respect to said partitions of said bight wall.

8. The carrier tube of claim 7 including a plurality of parallel extensions extending inwardly from said lock wall and said hinge wall in line with each other and a plurality of nubs on said bight wall.

9. The carrier tube of claim 8 wherein said plastic material is clear pvc.

10. The carrier tube of claim 8 in combination therewith, electronic connectors being located in said carrier tube separated from each other by said partitions.

11. The carrier of claim 1 wherein said live hinge comprises a relief extending along the integral junction of said cover wall to said hinge wall.

12. A method of mounting electronic connectors in an elongated extruded plastic anti-stat carrier tube comprising extruding the carrier tube in the form of a top member hinged at one edge to a U-shaped base by an integral live hinge with the top member being biased to an open position and with spaced parallel partitions on its inner surface, pressing the base and top member toward each other by a squeezing action along the portion of the carrier tube remote from the live hinge, engaging locking members on the outer surface of the base with locking members on the outer surface of the top member and engaging locking members on the inner surface of the base with locking members on the inner surface of the top member to double snap lock the carrier tube closed, and inserting the electronic connectors through an open end of the carrier tube with each connector between spaced parallel partitions.

* * * * *